United States Patent
Nagahashi et al.

(10) Patent No.: US 7,701,604 B2
(45) Date of Patent: Apr. 20, 2010

(54) PRINTING SYSTEM AND CLIENT DEVICE FOR THE SAME, PRINTING DEVICE, PRINTING METHOD, PRINTING PROGRAM AND RECORDING MEDIUM FOR THE SAME

(75) Inventors: Toshinori Nagahashi, Nagano (JP); Takashi Hyuga, Nagano (JP)

(73) Assignee: Seiko Epson Corporation (JP)

( * ) Notice: Subject to any disclaimer, the term of this patent is extended or adjusted under 35 U.S.C. 154(b) by 1239 days.

(21) Appl. No.: 11/237,111

(22) Filed: Sep. 28, 2005

(65) Prior Publication Data

US 2006/0066648 A1  Mar. 30, 2006

(30) Foreign Application Priority Data

Sep. 30, 2004 (JP) ............................. 2004-288690
Jul. 5, 2005 (JP) ............................. 2005-195812

(51) Int. Cl.
*G06K 15/00* (2006.01)
*G03G 15/08* (2006.01)

(52) U.S. Cl. .................... 358/1.15; 709/205; 709/219; 709/203; 399/24; 399/27

(58) Field of Classification Search ............... 358/1.15; 709/205, 219, 203; 399/24, 27
See application file for complete search history.

(56) References Cited

U.S. PATENT DOCUMENTS

| | | | | |
|---|---|---|---|---|
| 5,859,711 A | * | 1/1999 | Barry et al. | 358/296 |
| 6,356,359 B1 | * | 3/2002 | Motamed | 358/1.8 |
| 6,718,378 B1 | * | 4/2004 | Machida | 709/223 |
| 6,856,430 B1 | * | 2/2005 | Gase | 358/1.9 |
| 7,412,498 B2 | * | 8/2008 | Machida | 709/220 |
| 2003/0063575 A1 | * | 4/2003 | Kinjo | 370/265 |
| 2004/0190057 A1 | * | 9/2004 | Takahashi et al. | 358/1.15 |
| 2005/0206694 A1 | * | 9/2005 | Wadley | 347/85 |

FOREIGN PATENT DOCUMENTS

JP  2000-071582  3/2000

* cited by examiner

*Primary Examiner*—Chan S Park
(74) *Attorney, Agent, or Firm*—Harness, Dickey & Pierce, P.L.C.

(57) ABSTRACT

A printing system includes: a printing device that prints, using ink, an image including a plurality of pixels each assigned with any one of a plurality of tone values; a server device that distributes printing data of a printing image, and first data that represents a total number of pixels of the printing image on a tone value basis; and a client device that receives the printing data and the first data, and based on the first data and second data that represents an amount of ink per pixel needed for the printing device to print each of the tone values, calculates a required amount of ink needed for the printing device to print the printing image.

8 Claims, 13 Drawing Sheets

CONTENT PRINTING DATA CD

| PAGE | TOTAL NUMBER OF PIXELS ON A TONE VALUE BASIS FOR EACH PRINTING PAGE ||
|---|---|---|
| | TONE VALUE | THE NUMBER OF PIXELS |
| 1 | 0 | 300 |
| | ⋮ | ⋮ |
| | 127 | 700 |
| | ⋮ | ⋮ |
| | 255 | 1000 |
| 2 | 0 | 400 |
| | ⋮ | ⋮ |
| | 127 | |

REMAINING INK AMOUNT DATA ID

| PRINTER | THE NUMBER OF REMAINING DOTS |
|---|---|
| PRINTER5a | 1000000 |
| PRINTER5b | 1200000 |

FIG. 3A

CONTENT PRINTING DATA CD

| PAGE | TOTAL NUMBER OF PIXELS ON A TONE VALUE BASIS FOR EACH PRINTING PAGE ||
|---|---|---|
| | TONE VALUE | THE NUMBER OF PIXELS |
| 1 | 0 | 300 |
| | ⋮ | ⋮ |
| | 127 | 700 |
| | ⋮ | ⋮ |
| | 255 | 1000 |
| 2 | 0 | 400 |
| | ⋮ | ⋮ |
| | 127 | |
| | ⋮ | |

FIG. 3B

REMAINING INK AMOUNT DATA ID

| PRINTER | THE NUMBER OF REMAINING DOTS |
|---|---|
| PRINTER5a | 1000000 |
| PRINTER5b | 1200000 |

FIG. 3C

PRINTER TONE DOT NUMBER DATA PD

| TONE VALUE | THE NUMBER OF DOTS NEEDED TO PRINT A PIXEL FOR EVERY TONE VALUE |
|---|---|
| 0 | 0 |
| ⋮ | ⋮ |
| 127 | 8 |
| ⋮ | ⋮ |
| 255 | 16 |

PRINTER TONE DOT NUMBER DATA PD

| DEVICE TYPE | TONE VALUE | THE NUMBER OF DOTS NEEDED TO PRINT A PIXEL FOR EVERY TONE VALUE |
|---|---|---|
| A | 0 | 0 |
| | ⋮ | ⋮ |
| | 127 | 8 |
| | ⋮ | ⋮ |
| | 255 | 16 |
| B | 0 | 0 |
| | ⋮ | ⋮ |
| | 127 | 10 |
| | ⋮ | ⋮ |
| | 255 | 20 |

FIG. 9

CONTENT PRINTING DATA CD

| TOTAL NUMBER OF PIXELS FOR EVERY PAGE OF CONTENT ||
|---|---|
| TONE VALUE | THE NUMBER OF PIXELS |
| 0 | 1000 |
| ⋮ | ⋮ |
| 127 | 2500 |
| ⋮ | ⋮ |
| 255 | 3000 |

CONTENT PRINTING DATA CD

| REGION | | TOTAL NUMBER OF PIXELS PER REGION | |
|---|---|---|---|
| | REGION RANGE (PIXEL) | TONE VALUE | THE NUMBER OF PIXELS |
| REGION1 | 0~512 | 0 | 100 |
| | | ⋮ | ⋮ |
| | | 127 | 150 |
| | | ⋮ | ⋮ |
| | | 255 | 150 |
| REGION2 | 513~1024 | 0 | 150 |
| | | ⋮ | ⋮ |
| | | 127 | 300 |
| | | ⋮ | ⋮ |
| | | 255 | 500 |

FIG.14

PRINTING SYSTEM AND CLIENT DEVICE FOR THE SAME, PRINTING DEVICE, PRINTING METHOD, PRINTING PROGRAM AND RECORDING MEDIUM FOR THE SAME

BACKGROUND OF THE INVENTION

1. Technical Field

The present invention relates to a printing system, a printing device, a client device for the printing system, a printing method, a printing program, and a recording medium for the program, which allow estimation of the amount of ink needed for a printing operation.

2. Related Art

With related-art color printers, the amount of ink remaining can be checked on PC (personal computer) screens for colors of YMCK or others. The problem is that there is no indication whether the amount of ink remaining is sufficient to complete the next printing operation (images included) or not.

As a solution for such a problem, a method of calculating the amount of ink remaining prior to printing to determine whether the amount of ink is sufficient to complete the printing. More specifically, the method calculates the amount of ink needed for a printing operation by going through process steps for original images prior to printing. The process steps include color conversion, color correction, halftone process, or others, those having been generally performed during printing using printers.

The problem with this method is that it takes a long time to calculate the required amount of ink for the next printing. This is due to the enormous amount of processing information.

JP-A-2000-71582 (refer to column 0047, page 7) describes another technique for calculating the amount of ink needed for printing images without difficulty. The calculation operation is executed based on an average value of image tones, and with this technique, the operation load is said to be reduced.

The problem with this technique is that the required amount of ink is not calculated with accuracy. This is because the calculation operation is based on the average value of image tones.

SUMMARY

In consideration of the above problems, an advantage of the present invention is it provides a printing system, a printing device, a client device for the printing system, a printing method, a printing program, and a recording medium for the program, which allow quick and accurate calculation of an amount of ink needed for a printing operation.

A first aspect of the present invention is directed to a printing system including: a printing device that prints, using ink, an image including a plurality of pixels each assigned with any one of a plurality of tone values; a server device that distributes printing data of a printing image, and first data that represents the total number of pixels on a tone value basis for the printing image; and a client device that receives the distributed printing data and the distributed first data, and based on the first data and second data that represents an amount of ink per pixel needed for the printing device to print each of the tone values, calculates a required amount of ink needed for the printing device to print the printing image.

With the configuration of the first aspect, the server device distributes printing data that represents a printing image, and first data that represents the total number of pixels on a tone value basis for the printing image. The client device receives the printing data and the first data, and based on the first data and second data that represents an amount of ink per pixel needed for the printing device to print each of the tone values, calculates the required amount of ink needed for the printing device to print the printing image. As such, the client device calculates the required amount of ink with a simpler process step compared with that of other techniques so that the processing time can be favorably shortened. Moreover, the calculation operation is executed on a pixel basis so that the amount of ink can be calculated with more accuracy than the other techniques.

A second aspect of the invention is directed to a printing system that includes: a printing device that prints, using ink, an image including a plurality of pixels each assigned with any one of a plurality of tone values; and a processing device provided with a required amount of ink calculation unit that calculates a required amount of ink needed for the printing device to print a printing image on one or more pages or a part of a page based on first data that represents the total number of pixels on a tone value basis for the printing image, and second data that represents an amount of ink per pixel needed for the printing device to print each of the tone values.

With the configuration of the second aspect, the processing device calculates the required amount of ink needed to print a printing image on one or more pages or a part of a page. The calculation operation uses, as a basis, first data indicating the total number of pixels on a tone value basis for the printing image, and second data indicating the amount of ink per pixel required for the printing device to print each of the tone values. The processing device calculates the amount of ink with a simple process step on a pixel basis so that any required amount of ink can be swiftly calculated with more accuracy compared with the related-art process step.

A third aspect of the invention is directed to a printing system that includes: one or more printing devices that print, using ink, an image including a plurality of pixels each assigned with any one of a plurality of tone values; a server device that distributes a printing image on one or more pages or a part of a page, and first data that represents the total number of pixels on a tone value basis for the printing image; a reception unit that receives the first data and the printing image, and a client device provided with a required amount of ink calculation unit that calculates the required amount of ink needed for the printing device to print the printing image based on the first data and second data that represents an amount of ink per pixel needed for the printing device to print each of the tone values.

With the configuration of the third aspect, the client device receives the printing image and the first data distributed from the server device. The required amount of ink calculation unit provided to the client device uses the first and second data to calculate the amount of ink needed to print the printing image. The required amount of ink calculation unit is capable of calculating the amount of ink needed to print the printing image provided by the server device in a short processing time. Accordingly, the operation of calculating the amount of ink needed to print incoming images can be swiftly completed with accuracy.

Note that, when the required amount of ink is different among a plurality of printing devices due to the varying device types thereof, it is desirable that the required amount of ink calculation unit uses the second data, showing the amount of ink per pixel needed for the respective types of printing device to print the respective tone values. With this being the case, the calculation operation can be executed to see how much ink is required for the respective types of printing device for image printing.

It is preferable that the printing system is additionally provided with another client device that includes the reception unit and the required amount of ink calculation unit.

If this is the configuration, the first data is distributed from the server device not only to one client device but also to any others. This favorably eliminates the need for those client devices to calculate the total number of pixels for the respective tone values, and only the first data will be used to derive any required ink amount. The client devices do not have to go through the process step of calculating the total number of pixels for every tone value so that the amount of ink can be swiftly calculated irrespective of the number of client devices.

Preferably, the printing device is additionally provided with an amount of ink remaining detection unit that detects the amount of ink remaining left in the printing device, and the client device with a printing determination unit that receives the amount of ink remaining from the printing device, and determines whether the printing image can be printed or not based on the amount of ink remaining and the required amount of ink needed for the printing device to complete the printing operation.

With such a configuration, using the amount of ink remaining detected by the amount of ink remaining detection unit and the required amount of ink needed for printing, the printing determination unit can determine whether the amount of ink is sufficient to print any printing images on one or more pages or a part of a page. Accordingly, prior to printing of the printing images, an estimation can be made whether the amount of ink is sufficient to complete the printing operation.

With a preferable configuration, the server device distributes a plurality of images on a plurality of pages, and first data that represents the total number of pixels on a tone value basis for the printing images on the pages. The required amount of ink calculation unit calculates, for every page, a required amount of ink needed for the printing device to complete a printing operation based on the first and second data, and the printing determination unit determines whether printing can be carried out on a page basis based on the required amount of ink and the amount of ink remaining.

With this configuration, the operation is executed on a page basis to calculate the amount of ink needed for printing images found on a plurality of pages, thereby leading to a determination whether the printing device is carrying the calculated amount of ink for every page. This enables estimating whether the ink will last until the printing is completed on a page basis.

With a still preferable configuration, the server device distributes every image on a plurality of pages, and first data that represents the total number of pixels on a tone value basis for the images on the pages. The amount of ink calculation unit calculates a required amount of ink needed to print every image on the pages based on the first and second data, and the printing determination unit determines whether every image on the pages can be printed based on the required amount of ink and the amount of ink remaining.

With such a configuration, the operation is executed first to calculate the required amount of ink needed to print every image on a plurality of pages, and then to determine whether the printing device is carrying the calculated ink amount. This enables estimating, prior to printing, whether the ink will last until the printing is completed for every image on a plurality of pages.

Preferably, the server system distributes a printing image in a part of a page, and first data that represents the total number of pixels on a tone value basis for the printing image. The required amount of ink calculation unit calculates a required amount of ink needed to print the printing image on the part of the page based on the first and second data, and the printing determination unit determines whether the printing image on the part of the page can be printed based on the required amount of ink and the amount of ink remaining.

With this being the case, the operation is executed first to calculate the amount of ink needed to print a printing image on a part of a page, and then to determine whether the printing device is carrying the calculated ink amount. This enables estimating, prior to printing, whether the ink will last until the printing is completed for the printing image in a part of the page.

Here, the server device may be a Web server that publicly transmits the printing image and the first data over a network, and the client device may be a host computer that receives the printing image and the first data.

With this being the case, a computer device receives the printing image publicly transmitted from the Web server over the network. Thus received images are to be printed by the printing device. As significant as it is, because the Web server publicly transmits the first data together with the printing images, the processing time can be shortened for the computer device to calculate the amount of ink needed to print the received image.

Here, the server device may be a television broadcast station that distributes the image and the first data by wire or wirelessly, and the client device is a television receiver that displays the printing image distributed by wire or wirelessly.

With this being the case, images coming from the television broadcast station by wire or wirelessly are received by the television receiver for display thereon. The images thus displayed on the television receivers are to be printed by the printing device. As significant as it is, because the television broadcast station provides the first data together with the images, the processing time can be shortened for the television receiver to calculate the amount of ink needed to print the received images.

A fourth aspect of the invention is directed to a client device of a printing system for printing, using ink, an image including a plurality of pixels each assigned with any one of a plurality of tone values. The client device includes: a reception unit that receives a printing image on one or more pages or a part of a page, and first data that represents the total number of pixels on a tone value basis for the printing image; and a required amount of ink calculation unit that calculates a required amount of ink needed for the printing device to print the printing image based on the first data and second data that represents an amount of ink needed per pixel for each of the tone values.

With the configuration of the fourth aspect, using the printing image and the first data, the required amount of ink can be calculated swiftly with accuracy.

The invention can be also directed to a printing device. That is, in a fifth aspect, the invention is directed to a printing device for printing, using ink, an image including a plurality of pixels each assigned with any one of a plurality of tone values. The printing device includes: a reception unit that receives a printing image on one or more pages or a part of a page, and first data that represents the total number of pixels on a tone value basis for the printing image; and a required amount of ink calculation unit that calculates a required amount of ink needed for the printing device to print the printing image based on the first data and second data that represents the required number of dots needed per pixel for each of the tone values.

With the configuration of the fifth aspect, using the printing image and the first data provided by the server device, the required amount of ink can be calculated swiftly with accuracy.

The invention is also directed to a printing system. That is, a sixth aspect of the present invention is directed to a printing system that includes: one or more printing devices that print, using ink, an image including a plurality of pixels each assigned with any one of a plurality of tone values; a server device that distributes a printing image on one or more pages or a part of a page; and a client device that receives the distributed printing image. The server unit calculates third data that represents a required amount of ink needed for the printing device to print the printing image based on first data that represents the total number of pixels on a tone value basis for the printing image, and second data that represents an amount of ink per pixel needed for the printing device to print each of the tone values, and distributes the third data to the client device.

With such a configuration, the server device takes charge of calculating the required ink amount. Therefore, after receiving the third data, the client device has no need to go through the process step of calculating the required ink amount, and thus the required amount of ink needed for image printing can be immediately derived.

The invention is also directed to a printing method. That is, a seventh aspect of the invention is directed to a printing method including the steps of: printing, using ink, an image including a plurality of pixels each assigned with any one of a plurality of tone values; and calculating a required amount of ink needed in the printing step to print a printing image on one or more pages or a part of a page based on first data that represents the total number of pixels on a tone value basis for the printing image, and second data that represents an amount of ink per pixel needed in the printing step to print each of the tone values.

The invention is also directed to another printing method. That is, an eighth aspect of the present invention is directed to a printing method including the steps of: printing, using ink, an image including a plurality of pixels each assigned with any one of a plurality of tone values; distributing a printing image on one or more pages or a part of a page, and first data that represents the total number of pixels on a tone value basis for the printing image; receiving the distributed first data and the distributed printing image; and calculating a required amount of ink needed in the printing step to print the printing image based on the first data and second data that represents an amount of ink per pixel needed in the printing step to print each of the tone values.

The invention is also directed to a program or a recording medium carrying thereon the program. That is, a ninth aspect of the invention is directed to a printing program for printing, using ink, an image including a plurality of pixels each assigned with any one of a plurality of tone values. The printing program causes a computer device to function as a reception unit that receives a printing image on one or more pages or a part of a page, and first data that represents the total number of pixels on a tone value basis for the printing image; and a required amount of ink calculation unit that calculates a required amount of ink needed for the printing device to print the printing image based on the first data and second data read from a storage section, representing an amount of ink per pixel needed for each of the tone values.

The recording medium recording thereon the program includes various types of computer-readable medium, including flexible disks, CD-ROMs, IC cards, punch cards, and others.

BRIEF DESCRIPTION OF THE DRAWINGS

The invention will be described with reference to the accompanying drawings, wherein like numbers reference like elements, and wherein:

FIGS. 3A to 3C are all diagrams showing various types of data, and specifically, FIG. 3A shows content printing data that represents the total number of pixels for the respective printing pages on a tone basis, FIG. 3B shows amount of ink remaining data that represents the number of remaining dots, and FIG. 3C shows printer tone dot number data that represents the number of dots needed to print a pixel for the respective tone values;

FIG. 9 is a diagram showing printer tone dot number data in the fourth modified example;

FIG. 14 is a diagram showing content printing data in the ninth modified example.

DESCRIPTION OF THE PREFERRED EMBODIMENT

In the following description, a printing system of an embodiment according to the present invention is described by referring to the accompanying drawings. A printing system 1 of the present invention is in charge of calculating the amount of ink needed for printing images in any incoming contents using a printer (printing device), e.g., ink jet printer, and estimating whether the amount of ink is sufficient to complete the printing. With real-world printers, a plurality of color inks are used to print images each having a tone value for each of RGB colors to represent various colors, e.g., YMCK colors. In the following embodiment, for the sake of clarity, a case of printing in black a monochrome image using a printing device is described. The monochrome image is represented by tone values of black and white.

Figure 1:
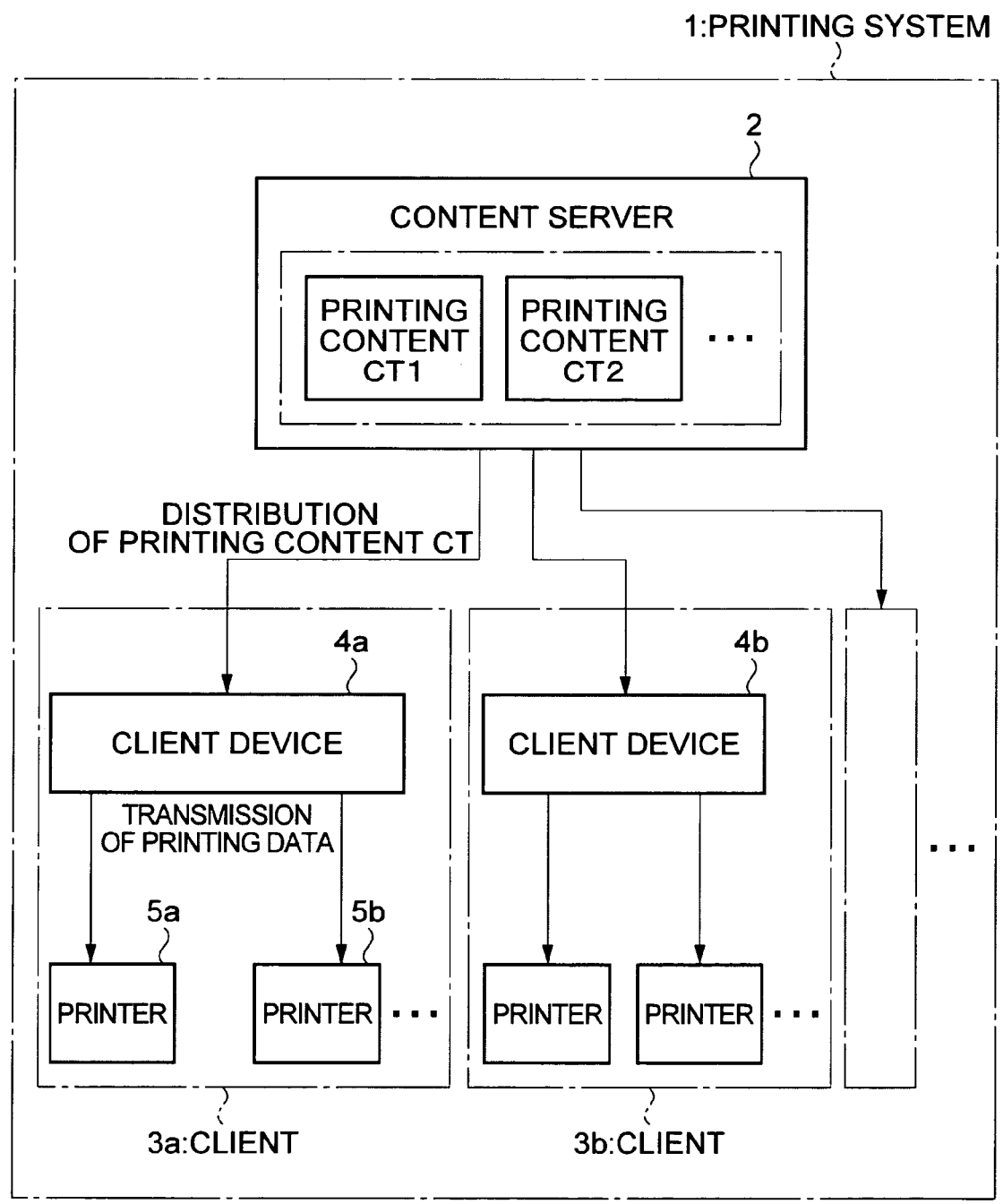
FIG. 1 is a diagram showing the configuration of a printing system.

FIG. 1 is a diagram showing the configuration of the printing system 1. As shown in FIG. 1, the printing system 1 is provided with a content server 2, and a plurality of clients 3a, 3b, and others connected to the content server 2. Each client 3 is provided a client device 4 and a printer 5. The client 3a is provided with a client device 4a and a printer 5a, the client 3b is provided with a client device 4b and a printer 5b, and the rest is the same. Herein, although the printers 5a, 5b, and others connected one client device 4 are not necessarily of the same type, it is assumed in the present embodiment that the printers are all of the same type, and consume the same amount of ink to print any one specific image.

Figure 2:
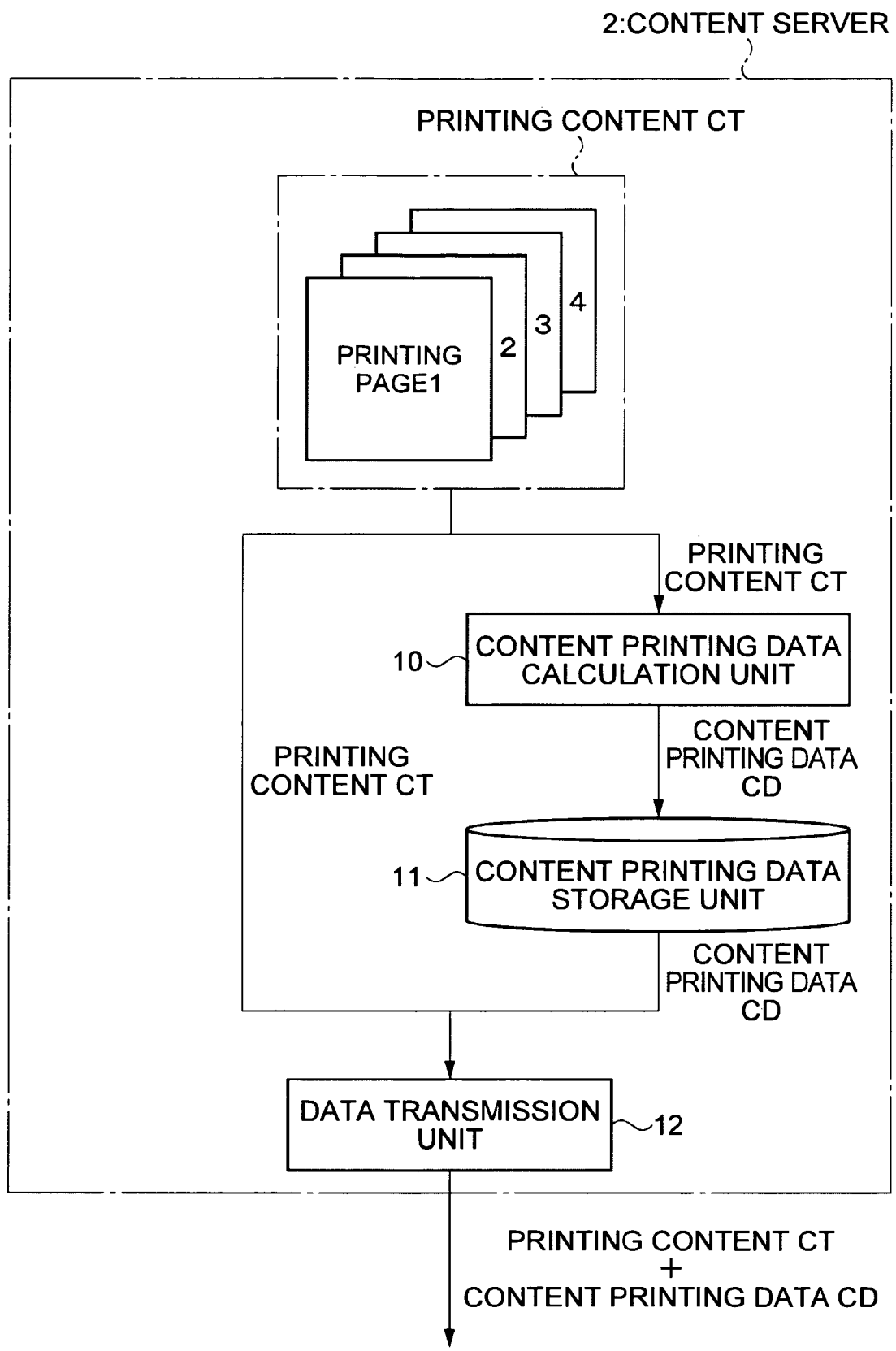
FIG. 2 is a diagram showing the configuration of a content server.

The content server 2 carries a plurality of printing contents CT, and serves as a Web server to distribute the printing contents CT to the client devices 4 over the Internet. FIG. 2 is a diagram showing the configuration of the content server 2.

As shown in the drawing, the content server 2 is provided with a plurality of printing contents CT, a content printing data calculation unit 10, a content printing data storage unit 11, and a data transmission unit 12.

The printing contents CT are each carrying a plurality of printing pages, and the printing pages each include a printing image. Herein, the printing page denotes a page to be printed by the printer 5 at one time, and thus the printing page may carry a plurality of images. With this being the case, the images are to be printed on a printing paper all at once. The images in the printing pages each include a plurality of pixels, and as described above, are all monochrome each having tone values representing shades of black and white for every pixel. In the real world, the printing contents CT are stored in a storage unit such as a hard disk (not shown) of the content server 2. The images are not limited to those each including a plurality of pixels, and may be texts or graphical objects described in any predetermined codes.

A content printing data calculation unit 10 calculates the total number of pixels on a tone basis for an image. This calculation operation is executed with respect to a printing content CT, every printing page thereof. The resulting number of pixels for every tone is represented as content printing data (first data) CD.

When an image(s) in the printing content CT are texts or graphical objects, the content printing data calculation unit 10 calculates the total number of pixels on a tone basis when the texts or the graphical objects are displayed in dot matrix form, so that the content printing data CD is generated.

FIGS. 3A to 3C are all diagrams showing various data to be generated by the printing system 1. FIG. 3A is showing the content printing data CD, representing the total number of pixels for every tone found in the respective printing pages. As shown in FIG. 3A, the content printing data CD carries data for every printing page of the printing content CD, i.e., the total number of pixels calculated on a tone value basis for images found in the respective printing pages. The data represents the image histogram.

A content printing data storage unit 11 is actually a storage unit exemplified by a hard disk, and provided to store the content printing data CD generated by the content printing data calculation unit 10.

Prior to distribution of a printing content CD, a data transmission unit 12 acquires content printing data CD corresponding to the printing content CT for distribution together with the printing content CT. Here, the data transmission unit 12 performs such distribution through communications with the clients 3 in accordance with the protocol such as HTTP (Hyper Text Transfer Protocol), FTP (File Transfer Protocol) or others.

Figure 4:
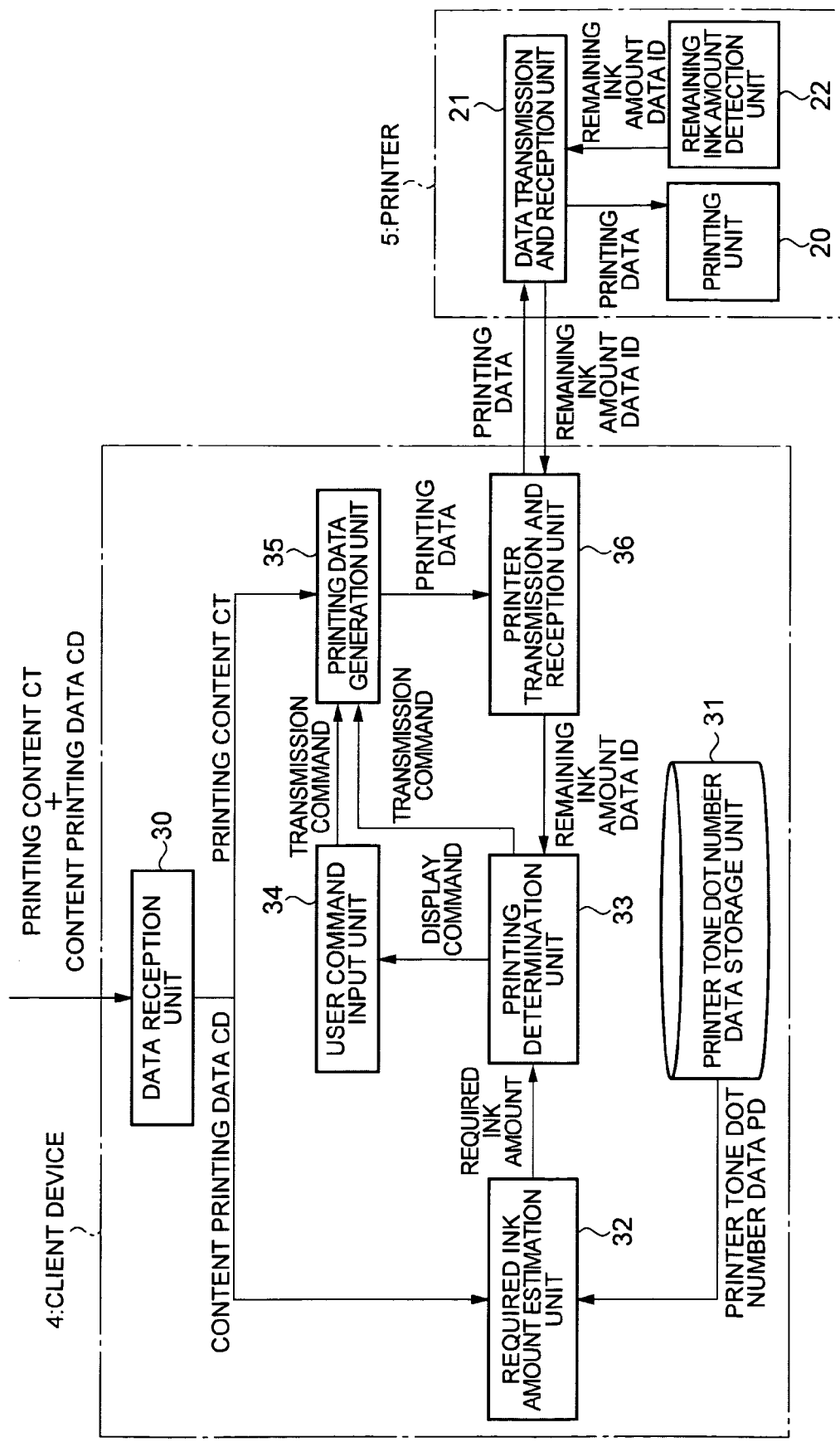
FIG. 4 is a diagram showing the configuration of a client.

FIG. 4 is a diagram showing the configuration of the client 3. As described above, the client 3 is provided with the client device 4 and the printer 5.

The printer 5 is described first. As shown in FIG. 4, the printer 5 is provided with a printing unit 20, a data transmission and reception unit 21, and an amount of ink remaining detection unit 22.

The printing unit 20 includes a printing head and an ink cartridge (not shown). The printing head ejects, in dots, ink in the ink cartridge for printing on a recording medium such as printing paper. As already described above, it is assumed in the present embodiment that monochrome printing is used so that the printing unit 20 uses only black ink for printing.

The amount of ink remaining detection unit 22 detects how much ink is left in the ink cartridge. The amount of ink remaining detection unit 22 converts the amount of ink remaining into the number of dots to calculate the number of ink dots left in the printer 5. This conversion operation is executed based on a predetermined relationship between the number of dots for printing, and the amount of ink in a single dot. The amount of ink remaining detection unit 22 then acquires a remaining ink data ID indicating the remaining number of ink dots (refer to FIG. 3B).

The data transmission and reception unit 21 performs data transmission and reception to/from the client devices 4. Herein, the data to be received is printing data, and the data to be transmitted is the remaining ink data ID. The printing data carries images in the printing pages of the printing content CT that have been converted in format for the printer 5 to handle.

The client device is described next. The client device 4 is a general-purpose computer device, mainly serving as a client to the content server 2, and as a host computer to the printer 5. As shown in FIG. 4, the client device 4 is provided with a data reception unit 30, a printer tone dot number data storage unit 31, a required amount of ink estimation unit 32, a printing determination unit 33, a user command input unit 34, a printing data generation unit 35, and a printer transmission and reception unit 36.

The data reception unit 30 receives the printing content CT and the content printing data CD, both of which are provided by the content server 2.

The printer tone dot number data storage unit (storage section) 31 is storing printer tone dot number data PD, representing the number of dots needed for the printer 5 connected to the client device 4 to print a pixel for every tone value. In actual use, the printer tone dot number data PD is stored in the hard disk of the client device 4 in advance. Alternatively, the printer tone dot number data PD may be acquired from the printer 5 connected to the client device 4, from any predetermined server over the Internet, or via a recording medium such as CD-ROM.

FIG. 3C shows exemplary printer tone dot number data PD, representing the number of dots needed to print a pixel for the respective tone values. As shown in the drawing, the printer tone dot number data PD uses the number of dots to represent the amount of ink needed for the printer 5 to print a pixel for the respective tone values.

Note here that the printer 5 of the present embodiment is exemplified as being an inkjet printer that performs printing by ejecting ink in dots. The printer tone dot number data PD here presents the amount of ink by the number of dots. Alternatively, the printer tone dot number data PD may represent the actual amount of ink needed for the printer 5 to print the pixels for the respective tone values.

When the printer 5 is a toner-consuming electrophotographic laser printer or copier, the printer tone dot number data PD represents the toner amount needed to print a pixel for the respective tone values. That is, the concept of ink includes the toner.

A required amount of ink estimation unit (required amount of ink calculation means) 32 calculates the required ink amount, representing, by the number of dots, the amount of ink needed for the printer 5 to print the printing content CT. For the calculation operation, used are the content printing data CD received by the data reception unit 30, and the printer tone dot number data PD stored in the printer tone dot number data storage unit 31. The required amount of ink estimation unit 32 calculates the required amount of ink for every page of the printing content CT.

The printing determination unit (printing determination means) 33 acquires the required amount ink calculated by the required amount of ink estimation unit 32 for the printing content CT, and the remaining ink data ID that is provided by the printer 5 via the printer transmission and reception unit 36. The printing determination unit 33 then compares the amount of ink remaining in the remaining ink data ID, i.e., the remaining number of dots, and the required amount of ink to see which is larger. As such, the printing determination unit 33 determines, for every printing page of the printing content CT, whether the printing content CT can be completely printed or not. When determined Yes, the printing determination unit 33 transmits a printing command for the printing data generation unit 35 to perform printing. When determined No, the printing determination unit 33 forwards a display command for the user command input unit 34 to display a message to prompt a user's determination.

Upon reception of the display command from the printing determination unit 33, the user command input unit 34 displays a message on a display such as LCD or CRT of the client device 4. The message is telling the concern that the ink may not be sufficient to complete the printing of the printing content CT. The user is thus prompted to determine whether he still wants to print the printing content CT. The user makes an input through operation of a keyboard or mouse of the client device 4 to indicate his or her determination, i.e., continue or stop the printing. When the user command input unit 34 receives an input indicating to continue the printing, a printing command is forwarded to the printing data generation unit 35 to perform printing.

The printing data generation unit 35 receives the printing command from the printing determination unit 33 or the user command input unit 34. The printing data generation unit 35 then goes through the process steps of color conversion, color correction, halftone process, or others to generate the printing data in which the printing content CT is converted in format for the printer 5 to handle. The resulting printing data is forwarded to the printer transmission and reception unit 36.

The printer transmission and reception unit 36 performs data transmission and reception to/from the printer 5. Herein, the data to be transmitted to the printer 5 is the printing data generated by the printing data generation unit 35, and the data to be received from the printer 5 is the remaining ink data ID. Upon reception of the remaining ink data ID from the printer 5, the printer transmission and reception unit 36 forwards the remaining ink data ID to the printing determination unit 33.

Figure 5:
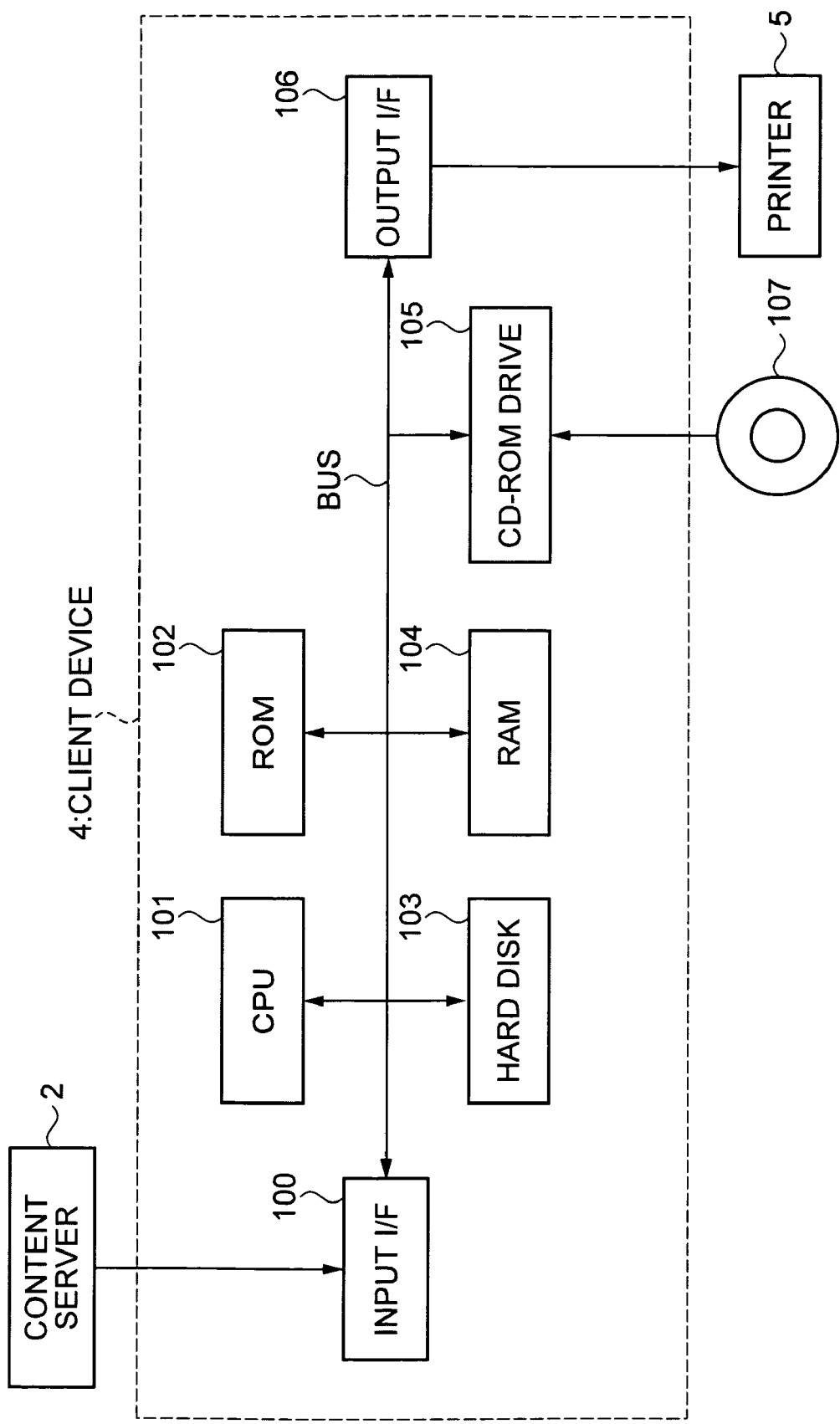
FIG. 5 is a diagram showing the hardware configuration of a client device.

FIG. 5 is a diagram specifically showing the hardware configuration of the client device 4. The client device 4 is provided with an input interface (hereinafter, referred to as input I/F) 100, a CPU 101, ROM 102, a hard disk 103, RAM 104, a CD-ROM drive 105, and an output interface (hereinafter, referred to as output I/F) 106. A connection is established among these components through a bus.

The input I/F 100 interfaces between the content server 2 and the client device 4. When the printing content CT and the content printing data CD provided and received under a predetermined transmission mode are input to the input I/F 100, the input I/F 100 temporarily stores the data into the RAM 104.

The output I/F 106 interfaces with the printer 5. The data to be provided from the client device 4 to the printer 5, and the data to be provided from the printer 5 to the client device 4 are both forwarded via the output I/F 106.

The CPU 101 reads and runs a program (printing program) stored in the hard disk 103 or the ROM 102 so that various processes are executed, thereby serving as the client device 4 of the printing system 1. That is, by the CPU 101 executing the program, the components of the client device 4 of FIG. 4 accordingly function. This program may be previously stored in the hard disk 103 or the ROM 102, or may be provided from outside to a computer device such as a CD-ROM 107 for storage into the hard disk 103 via the CR-ROM drive 105.

Alternatively, a server or others providing the program may be accessed over a network such as the Internet, and the program may be stored by data download.

By referring to the flowchart of FIG. 6, described next is the operation of the client device 4 of the present embodiment.

Figure 6:
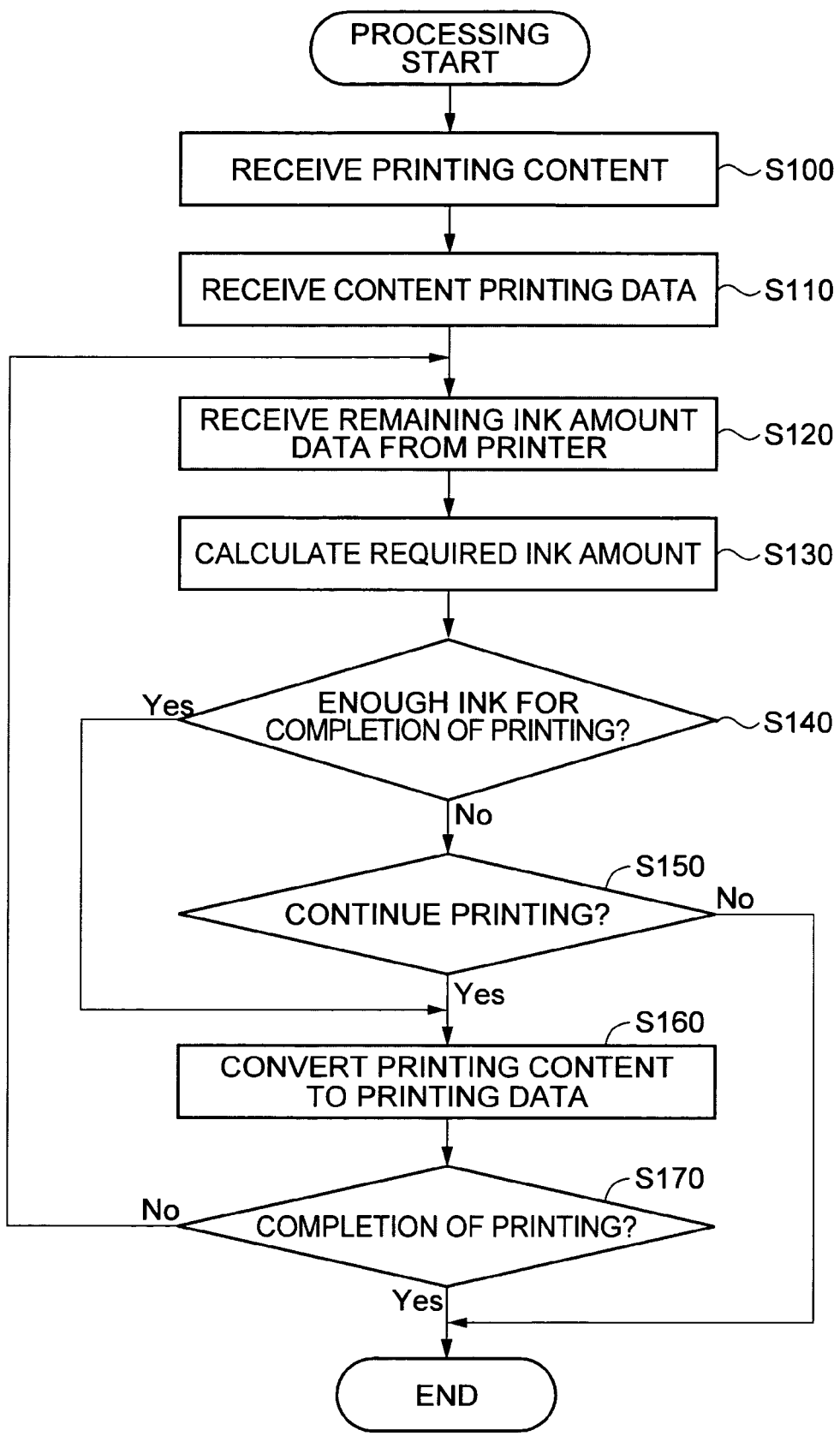
FIG. 6 is a flowchart showing the process flow for the client device.

Upon distribution of a printing content CT and content printing data CD by the content server 2 to the client device 4 (distribution step), the client device 4 starts executing the process steps of FIG. 6.

Step S100: The data reception unit 30 receives the printing content CT provided by the content server 2.

Step S110: The data reception unit 30 receives the content printing data CD provided by the content server 2.

Step S120: The printer transmission and reception unit 36 transmits a command for the printer 5 to detect the amount of ink remaining, and the amount of ink remaining detection unit 22 of the printer 5 responsively detects the amount of ink remaining. The printer 5 transmits a remaining ink data ID, and the printer transmission and reception unit 36 receives the remaining ink data ID.

Step S130: The required amount of ink estimation unit 32 refers to the content printing data CD and the printer tone dot number data PD stored in the printer tone dot number data storage unit 31 to calculate the required amount of ink to print printing page(s) of the printing content CT.

By referring to the content printing data CD of FIG. 3A and the printer tone dot number data PD of FIG. 3C, described here is the method of calculating the number of ink dots to be consumed for a printing operation. As shown in FIG. 3A, the content printing data CD is showing the total number of pixels for the respective printing pages of the printing content CT on the basis of tone values of "0 to 255".

A tone value is indicated by i, and the total number of pixels is x for the images in the respective printing pages on a tone value basis. With FIG. 3A example, in a printing page "1", the number of pixels having a tone value of "0" is "x(0)=300", the number of pixels having a tone value of "127" is "x(127)=700", and the number of pixels having a tone value of "255" is "x(255)=1000".

As shown in FIG. 3C, the printer tone dot number data PD is showing the number of dots needed for the printer 5 to print a pixel for the respective tone values. The number of dots needed to print a pixel having the tone value of "i" is indicated by y(i). With FIG. 3C example, the number of dots needed to print a pixel having a tone value of "0" is "y(0)=0", the number of dots needed to print a pixel having a tone value of "127" is "y(127)=8", and the number of dots needed to print a pixel having a tone value of "255" is "y(255)=16".

Using the total number of pixels x(i) for every tone value in the printing pages, and the number of dots y(i) needed to print a pixel varying in tone value, the number of dots N needed for printing images in the respective printing pages is expressed as below.

$$N = \Sigma_i X(i) \times y(i) \text{ (where i is an integer of 0 to 255)} \qquad 1$$

The equation 1 is used as a basis to multiply the number of dots needed to print each of the tone values by the respective tone values of "0 to 255". This multiplication leads to the number of dots needed to print images in a printing page(s) of the printing content CT, i.e., the required ink amount.

Step S140: The printing determination unit 33 compares the number of dots calculated in step S130 for printing with the remaining number of dots indicated by the amount of ink remaining data ID for printing. As such, the printing determination unit 33 determines whether the remaining ink will last until the printing page(s) of the printing content CT are completely printed. When the determination is made that the ink is not sufficient (No), the procedure goes to step S150, and when the determination is made that the ink is sufficient (Yes), the procedure goes to step S160.

Step S150: The user command input unit 34 displays on a liquid crystal display or others a message telling the concern that the ink may not be sufficient to complete the printing of the printing content CT, and the printing may be stopped before completion. After seeing the message, the user operates the mouse, keyboard, or others of the client device 4 to indicate his or her intention to continue or stop the printing. When the user command input unit 34 receives an input indicating to continue the printing (Yes), the procedure goes to step S160. When the input provided to the user command input unit 34 is indicating to stop the printing (No), the procedure is ended without printing the printing content CT.

Step S160: The printing data generation unit 35 generates printing data in which image data of the printing content CT is converted in format for the printer 5 to handle. The resulting printing data is transmitted by the printer transmission and reception unit 36 to the printer 5. The printer 5 then performs printing onto a printing paper in accordance with thus provided printing data.

Step S170: The printing determination unit 33 determines whether every printing page is completely through with printing for the printing content CT. When the printing is not yet through (No), the procedure returns to step S120 to repeat the processes of steps S120 to S160 for the next printing page. When the printing is through for every printing page (Yes), the procedure ends the processes of FIG. 5.

Note here that step S100 is equivalent to the reception process, step S130 to the required amount of ink calculation process, and step S160 to the printing process.

In the following description, the effects of the present embodiment are described.

1. In the related art, the printing data generation unit 35 calculates the required amount of ink by going through process steps of color conversion, color correction, halftone operation, or others, thereby causing the operation load to be large. On the other hand, the present embodiment is adopting a technique of simply performing calculation based on the equation 1 to derive the required ink amount. The calculation operation uses the total number of pixels on a tone value basis for an image in the content printing data CD, and the number of dots needed to print a pixel for the respective tone values indicated by the printer tone dot number data PD. Such a technique favorably reduces the operation load for the process step of calculating the amount of ink needed for printing, thereby leading to the shorter processing time. What is more, because the required amount of ink is calculated through operation per pixel, the required amount of ink can be calculated with more accuracy compared with the technology described in the Related Art. As such, according to the present invention, the procedure can be executed in a suitable manner in view of both the processing time and the calculation accuracy for the ink amount.

2. The client device 4 calculates the required amount of ink using the content printing data CD provided by the content server 2, and the printer tone dot number data PD that is previously stored in the client device 4. Accordingly, even if the printing system 1 includes a plurality of printers 5a, 5b, and others of the same device type, constructed is the client server system in which the respective printers 5 can swiftly calculate the required ink amount.

3. By making a determination for every printing page of a printing content CT to see whether the printing page can be printed, it becomes possible estimating whether the ink will be sufficient for the printing. This thus can help to avoid the printing being stopped before completion, thereby preventing waste of printing paper and ink.

4. The content printing data CD comes from the content server 2. This eliminates the need for the client device 4 to go through the operation of calculating the total number of pixels for the respective tone values for the printing content CD with respect to the required ink amount. Therefore, the processing time can be reduced for the client device 4.

FIRST MODIFIED EXAMPLE

In a first modified example, with a content server being a broadcast station, a client device is assumed as being a television receiver. With this being the case, the data transmission unit 12 of the client device 4 transmits radio waves in the form of ARIB STD-B24 or others, and the data transmission and reception unit 12 of the client device 4 serves as a television tuner for receiving the radio waves. Such a configuration allows the user to check contents coming from the broadcast station by looking at the display screen of the television receiver, and print the printing content CT displayed on the screen if wanted.

SECOND MODIFIED EXAMPLE

In the above-described embodiment, for the sake of simplicity, described is the case of printing a monochrome printing content CT using a black ink. As a second modified example, the black ink is not the only option for the color of the printing content CT and the ink(s) corresponding thereto, and images in the printing content CT may be of the color of RGB (Red, Green, and Blue) or CYMK (Cyan, Yellow, Magenta, and Black), or data corresponding to the ink type of the printer 5. In an exemplary case where the printer 5 prints an image of RGB format using the ink of CYMK color, used may be the content data CD representing the total number of pixels on a tone value basis for the respective colors of RGB, and the printer tone dot number data PD representing the amount of ink needed for the respective colors of CYMK needed to print a pixel varying in tone value for the respective colors of RGB.

THIRD MODIFIED EXAMPLE

Figure 7:
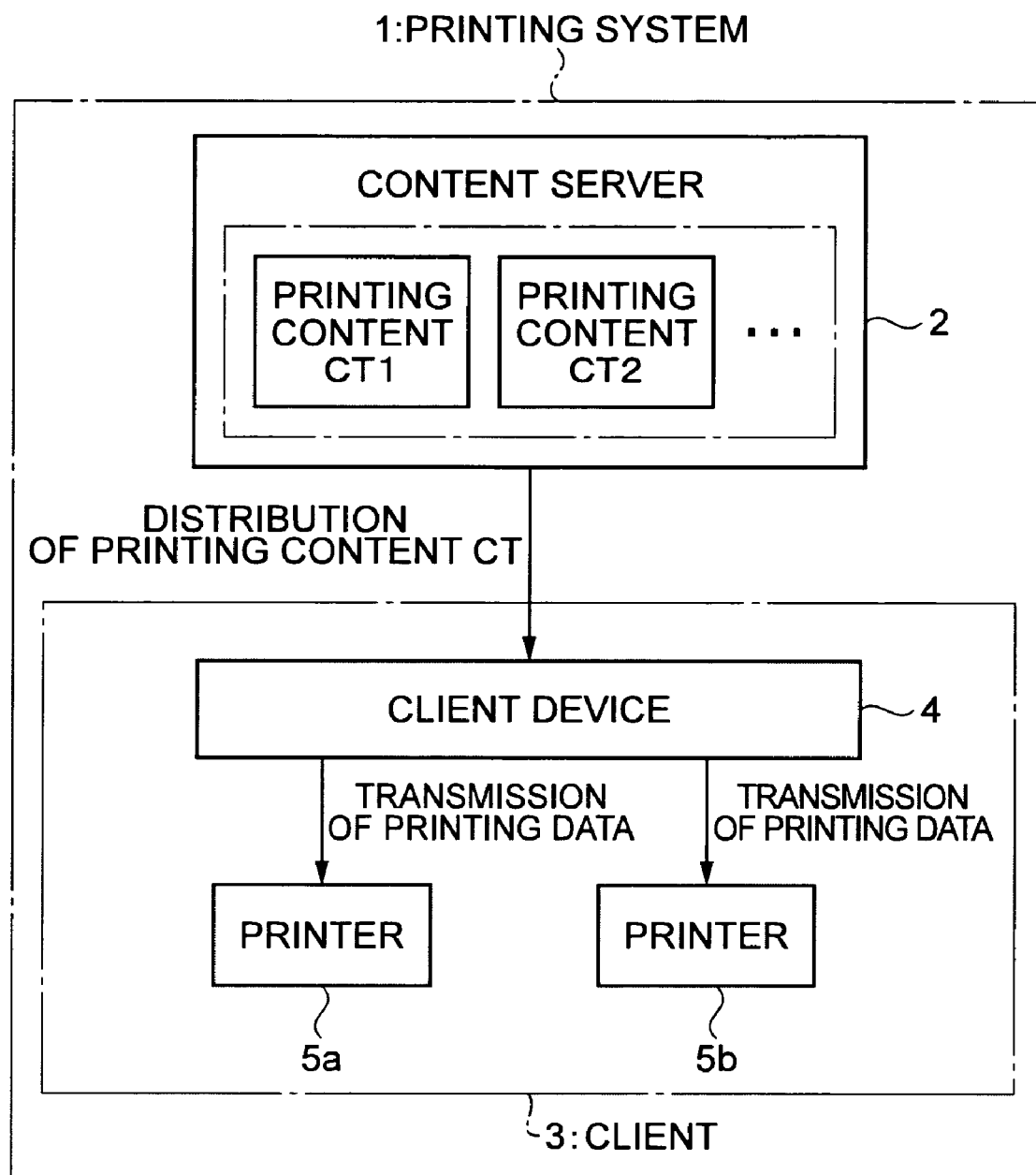
FIG. 7 is a diagram showing a third modified example.

In the above-described embodiment, described is the case of including a plurality of client devices 4 for a single content server. As an alternative configuration, as shown in FIG. 7, in the printing system 1, the client device 4 may have a one-to-one relationship with a content server.

FOURTH MODIFIED EXAMPLE

Figure 8:
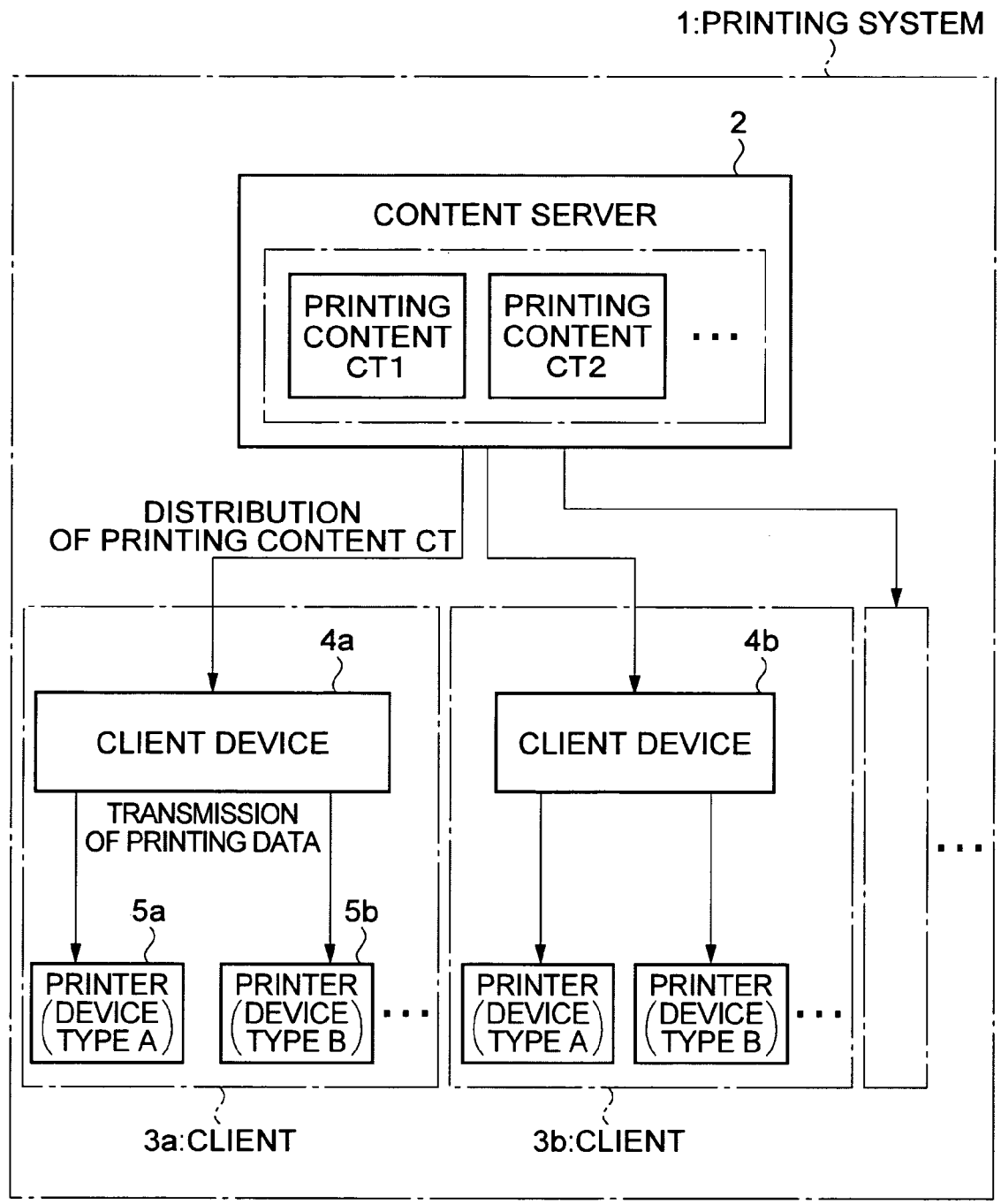
FIG. 8 is a diagram showing a fourth modified example.

In the above-described embodiment, described is the case that, in the printing system 1, a client device 4 includes a plurality of printer 5 of the same type. Alternatively, a client device 4 may include a plurality of printers 5 varying in type. As shown in FIG. 8, if a client device 4 includes the printer 5 of device type A and another of device type B, the required amount of ink estimation unit 32 uses the printer tone dot number data PD (refer to FIG. 9) for each of the types A and B to calculate the amount of ink needed for the printer of type A to print, and the amount of ink needed for the printer of type B to print. If this is the case, the printing determination unit 33 can determine whether the amount of ink is sufficient for the respective printers varying in type.

FIFTH MODIFIED EXAMPLE

Figure 10:
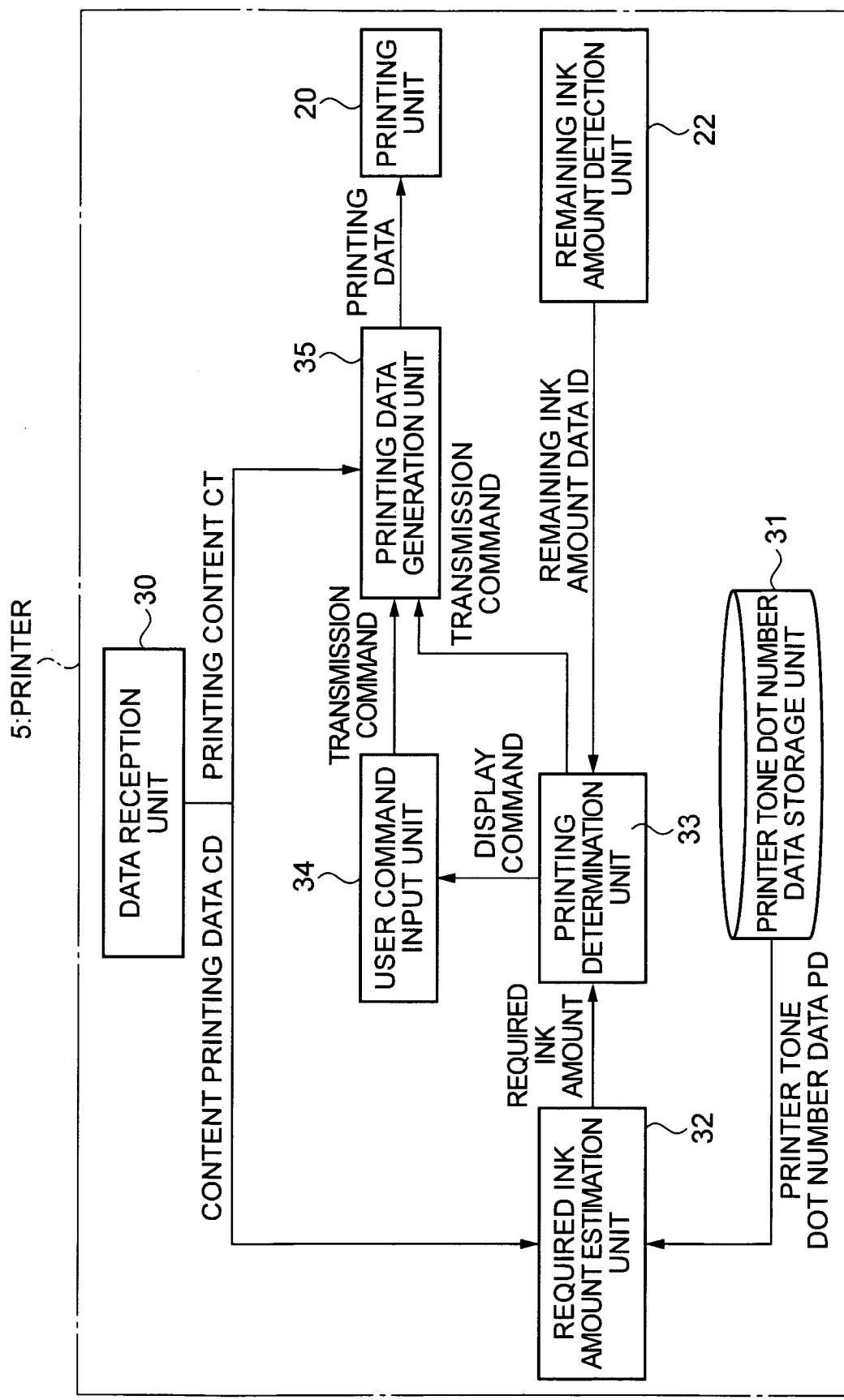
FIG. 10 is a diagram showing a fifth modified example.

In the above-described embodiment, the required amount of ink estimation unit 32 in the client device 4 takes charge of calculating the amount of ink needed for a printing operation. As a fifth modified example, the printer 5 may serve as the client device 4. That is, as shown in FIG. 10, the printer 5 is provided with the data reception unit 30, the printer tone dot number data storage unit 31, the required amount of ink estimation unit 32, the printing determination unit 33, and the printing data generation unit 35. With such a configuration, the printer 5 becomes able to receive the content printing data CD coming from the content server 2, and calculate the required amount of ink using the content printing data CD and the printer tone dot number data PD. Moreover, without using the client device 4, the printer 5 can make a determination whether or not the printing operation is executable.

SIXTH MODIFIED EXAMPLE

Figure 11:
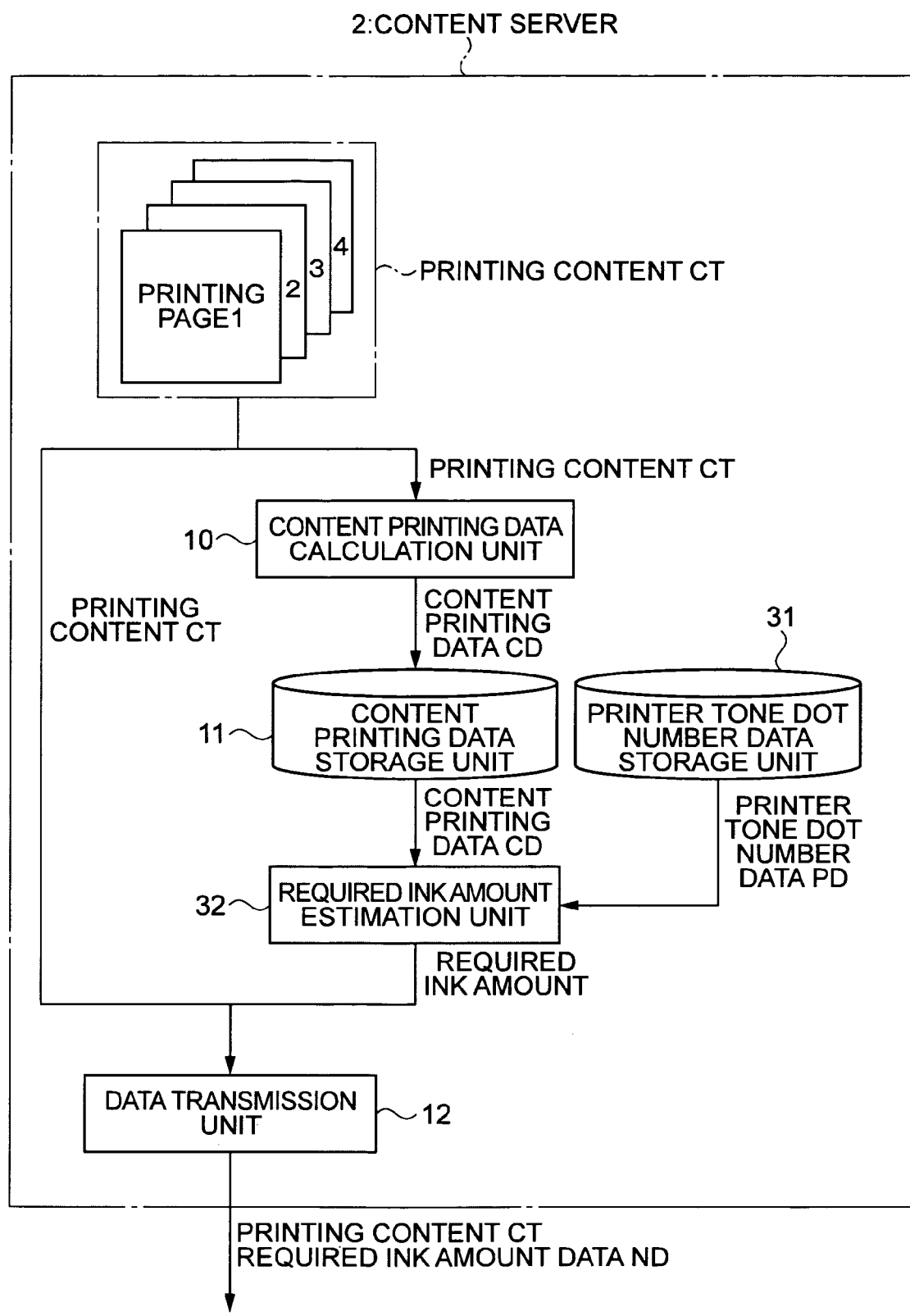
FIG. 11 is a diagram showing a sixth modified example.

In a sixth modified example, the printer 5 provided to the respective clients 3 is of the same type, and as shown in FIG. 11, the content server 2 is provided with the content printing data CD, the printer tone dot number data storage unit 31, and the required amount of ink estimation unit 32. The content server 2 calculates the required amount of ink based on the content printing data CD and the printer tone dot number data PD, and distributes required amount of ink data ND (third data) indicating the amount of ink to the client device 4 or the printer 5 together with the printing content CT. With this being the case, when any specific printing content CT is to be printed by a plurality of printer 5 of the same type, the amount of ink for use of the printer 5 may be calculated only once by the content server 2. Accordingly, there is no need to repeat the same process in the system, thereby resulting in an efficient process.

SEVENTH MODIFIED EXAMPLE

In the above-described embodiment, the content server 2 is distributing the printing content CT and the content printing data CD. In a seventh modified example, the content printing data CD is embedded in the printing content CT as management data (meta data) of the printing content CT. Accordingly, the printing content CT and the content printing data CD are handled as a single file. If this is the case, a one-to-one relationship is established between the printing content CT and the content printing data CD, thereby simplifying the data handling.

EIGHTH MODIFIED EXAMPLE

Figures 12, 13:
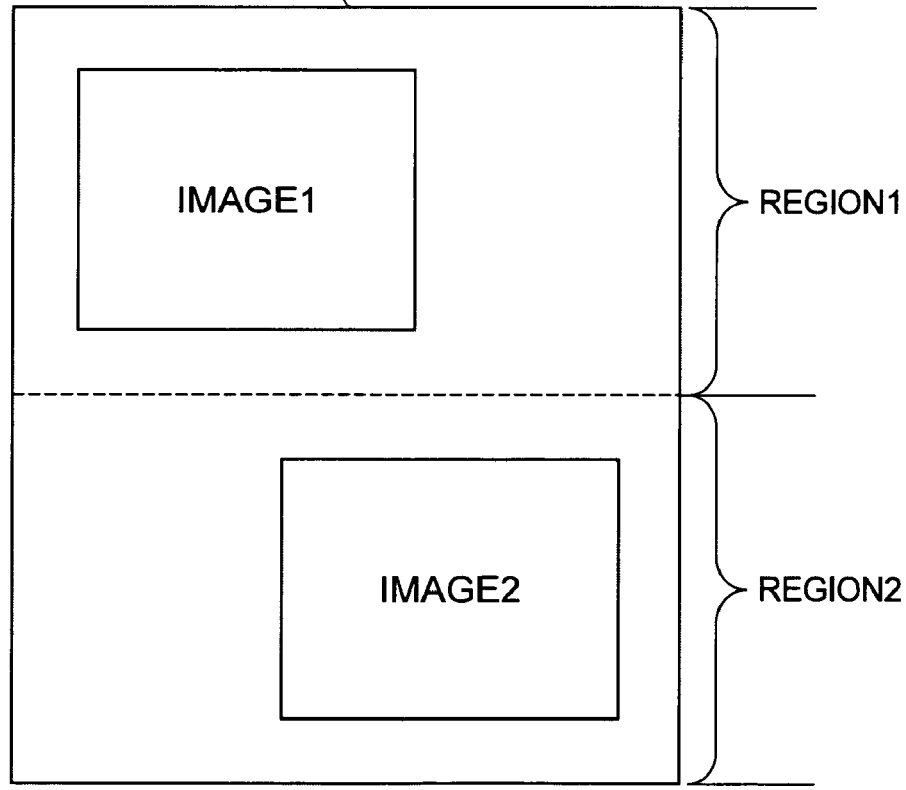
FIG. 12 is a diagram showing an eighth modified example.
FIG. 13 is a diagram showing a ninth modified example.

In the above-described embodiment, the printing determination unit 33 determines whether a printing operation is executable on a page basis. Alternatively, a determination may be made whether a plurality of printing pages in a printing content CT can be thoroughly printed. For example, the required amount of ink estimation unit 32 may calculate the required amount of ink for each of the pages in the printing content CT, and adds the results together so that the amount of ink needed to print every page is calculated. The printing determination unit 33 then compares the amount of ink needed to print every page with the amount of ink remaining to determine whether or not the printing content can be completely printed. The content printing data calculation unit 10 may generate the content printing data CD having the total number of pixels for every page of the printing content as shown in FIG. 12. If this is the case, the required amount of ink estimation unit 32 becomes able to calculate the amount of ink needed to print every page of a printing content without difficulty.

NINTH MODIFIED EXAMPLE

The printing determination unit 33 may determine whether or not a printing page can be partially printed in the printing content. For example, as shown in FIG. 13, if a printing page includes two images, the content printing data calculation unit 10 calculates the total number of pixels for the respective tome values for the two region ranges including the images. As shown in FIG. 14, the content printing data CD is generated, indicating the total number of pixels for each of the two regions. The content printing data CD includes information indicating the range of the regions. With this being the case, the required amount of ink estimation unit 32 becomes able to calculate the required amount of ink for every part of the printing page. The printing determination unit 33 becomes able to determine whether or not a printing operation is executable for every part of the printing page.

What is claimed is:

1. A printing system, comprising:
   one or more printing devices that print, using ink, an image including a plurality of pixels each assigned with any one of a plurality of tone values;
   a server device that distributes a printing image on one or more pages or a part of a page, and first data that represents a histogram of the total number of pixels at each of tone values assigned to the pixels for the printing image;
   a reception unit that receives the first data and the printing image, and
   a client device that includes a required amount of ink calculation unit that calculates a required amount of ink needed for the printing device to print the printing image based on the first data and second data that represents an amount of ink per pixel needed for the printing device to print each of the tone values, wherein
   the printing device further includes an amount of ink remaining detection unit that detects an amount of ink remaining left in the printing device, and
   the client device further includes a printing determination unit that receives the amount of ink remaining from the printing device, and determines whether the printing image can be printed based on the amount of ink remaining and the required amount of ink needed for the printing device to complete printing, wherein
   the amount of ink per pixel needed for the printing device to print each of the tone values is represented by a required number of dots needed per pixel for each of the tone values, and wherein the amount of ink remaining left in the printing device is represented by a number of remaining dots.

2. The printing system according to claim 1, wherein the printing system is further provided with another client device that includes the reception unit and the required amount of ink calculation unit.

3. The printing system according to claim 1, wherein
   the server device distributes a plurality of printing images on a plurality of pages and third data representing a histogram of the total number of pixels at each of tone values assigned to the pixels for the printing images in each of the pages, the required amount of ink calculation unit calculates, for each of the pages, the required amount of ink needed for the printing device to complete printing based on the third and second data, and the printing determination unit determines whether printing can be completed on a page basis based on the required amount of ink and the amount of ink remaining.

4. The printing system according to claim 3, wherein the server device distributes all of the printing images on the pages and fourth data representing a histogram of the total number of pixels at each of tone values assigned to the pixels for all of the printing images on the pages, the required amount of ink calculation unit calculates, for each of the pages, a required amount of ink needed to print all of the images on the pages based on the fourth and second data, and the printing determination unit determines whether all of the images on the pages can be printed based on the required amount of ink and the amount of ink remaining.

5. The printing system according to claim 1, wherein the server device comprises a Web server that publicly transmits the printing image and the first data over a network, and the client device comprises a host computer that receives the printing image and the first data.

6. The printing system according to claim 1, wherein the server device comprises a television broadcast station that distributes the printing image and the first data by wire or wirelessly, and the client device comprises a television receiver that receives and displays the printing image distributed by wire or wirelessly.

7. A printing system, comprising:

one or more printing devices that print, using ink, an image including a plurality of pixels each assigned with any one of a plurality of tone values;

a server device that distributes a printing image on one or more pages or a part of a page; and a client device that receives the printing image distributed, wherein the server unit:

calculates third data that represents a required amount of ink needed for the printing device to print the printing image based on first data that represents a histogram of the total number of pixels at each of tone values assigned to the pixels for the printing image, and second data that represents an amount of ink per pixel needed for the printing device to print each of the tone values, and distributes the third data to the client device, wherein the printing device further includes an amount of ink remaining detection unit that detects an amount of ink remaining left in the printing device, and the client device further includes a printing determination unit that receives the amount of ink remaining from the printing device, and determines whether the printing image can be printed based on the amount of ink remaining and the third data, wherein the amount of ink per pixel needed for the printing device to print each of the tone values is represented by a required number of dots needed per pixel for each of the tone values, and wherein the amount of ink remaining left in the printing device is represented by a number of remaining dots.

8. A method for printing using a printer, the method comprising the steps of:

printing, using ink, an image including a plurality of pixels each assigned with any one of a plurality of tone values;

distributing, based on the image, a printing image on one or more pages or a part of a page, and first data that represents a histogram of the total number of pixels at each of tone values assigned to the pixels for the printing image;

receiving the distributed first data and the distributed printing image;

calculating a required amount of ink needed in the printing step to print the printing image based on the first data and second data that represents an amount of ink per pixel needed in the printing step to print each of the tone values;

detecting an amount of ink remaining left in the printer;

receiving the amount of ink remaining from the printer; and determining whether the printing image can be printed based on the amount of ink remaining and the required amount of ink needed for the printer to complete printing, wherein the amount of ink per pixel needed for the printer to print each of the tone values is represented by a required number of dots needed per pixel for each of the tone values, and wherein the amount of ink remaining left in the printer is represented by a number of remaining dots.

* * * * *